United States Patent
Yazdani et al.

(10) Patent No.: US 9,767,634 B2
(45) Date of Patent: Sep. 19, 2017

(54) SYSTEMS AND METHODS FOR MEASURING CONSUMPTION OF ENTERTAINMENT COMMODITIES

(75) Inventors: Amir Yazdani, Portland, OR (US); Ken M. Papagan, Los Angeles, CA (US); Cathy S. Hetzel, Portland, OR (US); Aaron J. Harsh, Portland, OR (US); Chris R. Behnke, Gresham, OR (US)

(73) Assignee: Rentrak Corporation, Portland, OR (US)

( * ) Notice: Subject to any disclaimer, the term of this patent is extended or adjusted under 35 U.S.C. 154(b) by 1243 days.

(21) Appl. No.: 11/257,578

(22) Filed: Oct. 24, 2005

(65) Prior Publication Data

US 2006/0122877 A1    Jun. 8, 2006

Related U.S. Application Data

(63) Continuation-in-part of application No. 10/641,792, filed on Aug. 15, 2003, now abandoned.

(51) Int. Cl.
*G06Q 10/00* (2012.01)
*G07F 5/18* (2006.01)
(Continued)

(52) U.S. Cl.
CPC ............... *G07F 5/18* (2013.01); *G06Q 10/06* (2013.01); *G06Q 10/087* (2013.01); *G06Q 20/20* (2013.01);
(Continued)

(58) Field of Classification Search
CPC combination set(s) only.
See application file for complete search history.

(56) References Cited

U.S. PATENT DOCUMENTS

| 4,025,851 A | 5/1977 | Haselwood et al. |
| 4,566,030 A | 1/1986 | Nickerson et al. |

(Continued)

FOREIGN PATENT DOCUMENTS

| WO | WO 02/01451 | 1/2002 |
| WO | WO 02/11067 | 2/2002 |
| WO | WO-02/079898 A2 | 10/2002 |

OTHER PUBLICATIONS

"Profits Out of the Picture: Research Issues and Revenue Sources Beyond the North American Box Office" by Weinberg, C. of UBC Faculty of Commerce, Dec. 19, 2003.

(Continued)

*Primary Examiner* — Fateh M Obaid
(74) *Attorney, Agent, or Firm* — Baker & Hostetler LLP

(57) ABSTRACT

Systems and methods for measuring consumption of entertainment commodities distributed through at least two distribution channels by at least one distribution network operator to one or more media receivers. The methods include collecting consumption data from at least one distribution network operator. The at least one distribution network operator distributes entertainment commodities through at least a first distribution channel and a second distribution channel. The collected consumption data relates to entertainment commodities distributed through at least the first distribution channel and the second distribution channel. The collected consumption data includes at least one inconsistency. The collected consumption data is loaded into a computerized database adapted to store, process, and report on consumption. Cleaned consumption data is produced by reconciling consumption data inconsistencies. A consumption data report is based at least in part on the cleaned consumption data. The consumption data report (Continued)

communicates consumption of at least one entertainment commodity.

16 Claims, 1 Drawing Sheet

(51) Int. Cl.

| | | |
|---|---|---|
| *G06Q 10/06* | (2012.01) | |
| *G06Q 10/08* | (2012.01) | |
| *G06Q 20/20* | (2012.01) | |
| *G06Q 30/02* | (2012.01) | |
| *G07F 11/00* | (2006.01) | |
| *G07G 1/14* | (2006.01) | |

(52) U.S. Cl.
CPC .......... *G06Q 30/02* (2013.01); *G07F 11/002* (2013.01); *G07G 1/14* (2013.01)

(56) References Cited

U.S. PATENT DOCUMENTS

| | | | |
|---|---|---|---|
| 4,567,511 A | 1/1986 | Smith et al. | |
| 4,578,700 A | 3/1986 | Roberts et al. | |
| 4,658,290 A | 4/1987 | McKenna et al. | |
| 4,816,904 A | 3/1989 | McKenna et al. | |
| 4,885,632 A | 12/1989 | Mabey et al. | |
| 4,912,552 A | 3/1990 | Allison et al. | |
| 4,972,504 A | 11/1990 | Daniel, Jr. et al. | |
| 5,155,591 A | 10/1992 | Wachob | |
| 5,251,324 A | 10/1993 | McMullan, Jr. | |
| 5,374,951 A | 12/1994 | Welsh | |
| 5,382,970 A | 1/1995 | Kiefl | |
| 5,396,417 A | 3/1995 | Burks et al. | |
| 5,584,050 A | 12/1996 | Lyons | |
| 5,600,364 A | 2/1997 | Hendricks et al. | |
| 5,734,720 A | 3/1998 | Salganicoff | |
| 5,826,165 A | 10/1998 | Echeita et al. | |
| 5,848,396 A | 12/1998 | Gerace | |
| 5,892,900 A * | 4/1999 | Ginter et al. | 726/26 |
| 6,006,265 A | 12/1999 | Rangan et al. | |
| 6,121,963 A | 9/2000 | Ange | |
| 6,169,542 B1 | 1/2001 | Hooks et al. | |
| 6,173,271 B1 | 1/2001 | Goodman et al. | |
| 6,286,140 B1 | 9/2001 | Ivanyi | |
| 6,564,381 B1 | 5/2003 | Hodge et al. | |
| 6,792,411 B1 | 9/2004 | Massey, Jr. | |
| 6,839,681 B1 | 1/2005 | Hotz | |
| 6,925,469 B2 | 8/2005 | Headings et al. | |
| 7,039,930 B1 | 5/2006 | Goodman et al. | |
| 7,062,457 B1 | 6/2006 | Kaufman | |
| 7,254,827 B1 * | 8/2007 | Terreault | 725/125 |
| 7,590,866 B2 | 9/2009 | Hurtado et al. | |
| 7,607,148 B2 * | 10/2009 | Feinberg et al. | 725/22 |
| 7,729,940 B2 | 6/2010 | Harvey et al. | |
| 7,788,684 B2 | 8/2010 | Petrovic et al. | |
| 7,813,954 B1 | 10/2010 | Price | |
| 8,000,993 B2 | 8/2011 | Harvey et al. | |
| 8,060,398 B2 | 11/2011 | Canning et al. | |
| 8,112,301 B2 | 2/2012 | Harvey et al. | |
| 2001/0020236 A1 | 9/2001 | Cannon | |
| 2001/0034703 A1 | 10/2001 | Picciallo et al. | |
| 2002/0133490 A1 | 9/2002 | Conkwright | |
| 2003/0004833 A1 | 1/2003 | Pollak et al. | |
| 2003/0078827 A1 | 4/2003 | Hoffman | |
| 2004/0003392 A1 | 1/2004 | Trajkovic | |
| 2004/0025174 A1 | 2/2004 | Cerrato | |
| 2004/0030781 A1 | 2/2004 | Etesse et al. | |
| 2004/0049465 A1 | 3/2004 | Engler et al. | |
| 2004/0073916 A1 * | 4/2004 | Petrovic et al. | 725/18 |
| 2004/0133793 A1 | 7/2004 | Ginter et al. | |
| 2004/0133909 A1 | 7/2004 | Ma | |
| 2004/0244029 A1 | 12/2004 | Gross | |
| 2005/0038706 A1 | 2/2005 | Yazdani et al. | |
| 2006/0095792 A1 * | 5/2006 | Hurtado et al. | 713/189 |
| 2006/0122877 A1 | 6/2006 | Yazdani et al. | |
| 2007/0198327 A1 | 8/2007 | Yazdani | |
| 2009/0240572 A1 | 9/2009 | Yazdani et al. | |

OTHER PUBLICATIONS

"Sales Through Sequential Distribution Channels: An Application to Movies and Videos", Journal of Marketing, vol. 64, Jul. 2000, p. 18-33, by Lehmann, Donald R. & Weinberg, Charles B.
SOP 00-2 "Accounting by producers or distributors of films", Journal of Accountancy, Aug. 2000, p. 104-119.
"Accounting Changes for the Film Industry", The CPA Journal, Oct. 2001, p. 33-38, by Levine, Marc H. & Siegel, Joel G.
"Behind Hollywood's cameras: Motion pictures accounting and financing", Journal of Accountancy, Nov. 1985, by Kells, Peter C.
Non-Final Office Action for U.S. Appl. No. 12/409,417, Mail Date Jul. 18, 2014, Examiner M. T. T. Thein, 14 pages.
Final Office Action for U.S. Appl. No. 12/409,417, Mail Date May 23, 2012, Examiner M. Thein, 16 pages.
European Patent Office, Communication pursuant to Article 94(3) EPC for related application EP Patent Application No. 06826596.6, dated Aug. 25, 2015.
European Patent Office, European Search Report for related application EP Patent Application No. 06826596.6, dated Mar. 21, 2011.
International Search Report for related international Patent Application No. PCT/US2006/041547, dated Jan. 22, 2008.

* cited by examiner

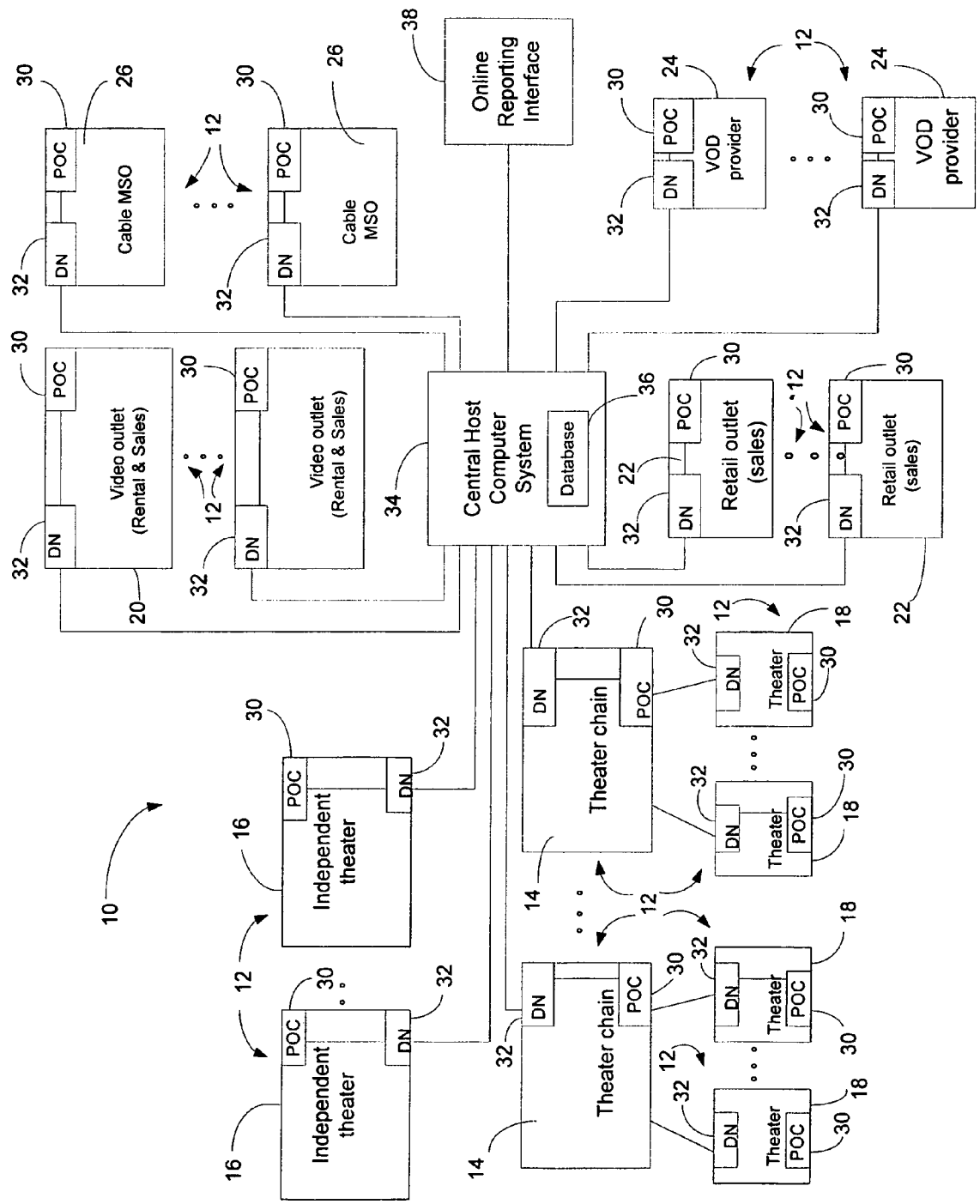

SYSTEMS AND METHODS FOR MEASURING CONSUMPTION OF ENTERTAINMENT COMMODITIES

CROSS-REFERENCE TO RELATED APPLICATIONS

This is a continuation-in-part application of U.S. patent application Ser. No. 10/641,792 filed on Aug. 15, 2003 now abandoned, entitled "BUSINESS TRANSACTION REPORTING SYSTEM." The entire disclosure of which is incorporated herein for all purposes.

FIELD OF THE INVENTION

The present disclosure is related to systems and methods for measuring consumption of entertainment commodities distributed through at least two distribution channels.

BACKGROUND

Entertainment companies invest millions of dollars into the development and production of entertainment commodities for release and distribution to consumers in the form of movies, television shows, advertising materials, video games, books, music, and the like. Many entertainment companies develop entertainment commodities with the intent to release the same, similar, or related entertainment commodity in more than one form. Examples of this practice include movies that are based on books, music made for movies but also for distribution as music separate from the movie, and video games based on movies. Moreover, entertainment companies are able to expand the traditional definition of entertainment commodity through sales of retail goods associated with the content developed by the entertainment company, such as t-shirts, calendars, posters, and other products that carry images or other content developed by the entertainment company.

Due to entertainment commodities being released, marketed, and distributed by entertainment companies in a number of different forms, products incorporating the same entertainment commodity are often distributed in a plurality of distribution channels. Entertainment companies go to great lengths to maximize the consumption of the commodity in the various distribution channels. The manner in which the entertainment commodity is released and the marketing associated with the commodity may vary depending on the marketing theory, the past performance of the commodity, and the impact the entertainment company is seeking for a given entertainment commodity. Marketing and distribution strategies are often complex and somewhat fluid while the entertainment commodity courses through its life-cycle and through the various distribution channels. Entertainment companies are generally anxious to know the results of their strategies as soon as possible to enable them to make whatever changes may be necessary to maximize the consumption of and/or the revenue from their entertainment commodities.

Different entertainment commodities may be distributed through different distribution channels depending on the content or origin of the entertainment commodity. For example, an entertainment commodity that begins as a video game may become a feature film less frequently than the inverse. Some entertainment commodities that begin as feature films distributed to movie theaters are also distributed via one or more additional distribution channels, such as via pay-per-view providers, video on demand providers, video rental outlets, video retail outlets, premium cable or satellite channels, subscription cable or satellite channels, network television channels, and various non-traditional distribution channels through which the entertainment commodity may be cross-marketed, such as retail consumer products. While different entertainment commodities may be distributed through different distribution channels, or stages in the life-cycle of the commodity, nearly all entertainment commodities are distributed through at least two distribution channels, whether traditional or non-traditional.

Many entertainment companies collect data on the performance of entertainment commodities at discrete stages during the life-cycle of the entertainment commodity, such as the performance in the discrete distribution channels. Unfortunately, different distributors within and between the various distribution channels collect different types of data or report the performance of entertainment commodities in different manners. For example, a single entertainment commodity may be represented by a number of different titles depending on the distributor and the distribution channel. In most circumstances, the variations in the title are necessitated by the distribution channel itself or by the distributors' collection and reporting systems. Accordingly, when an entertainment company wants to know how one of its commodities is performing, especially over the entire life-cycle of the commodity or between different stages in the life-cycle, the process can be daunting. Due to the dozens or even hundreds of ways that the consumption of an entertainment commodity can be reported, entertainment companies have not had a computerized system or method of reconciling the numerous reports to get a clear picture of how an entertainment commodity is performing.

SUMMARY

Systems and methods are disclosed for measuring consumption of entertainment commodities distributed by at least one distribution network operator to one or more media receivers. The entertainment commodities for which consumption is measured in the present systems and methods are distributed through at least two distribution channels. The methods of the present disclosure include collecting consumption data from at least one distribution network operator. The at least one distribution network operator distributes entertainment commodities through at least a first distribution channel and a second distribution channel. The collected consumption data relates to entertainment commodities distributed through at least the first and the second distribution channels. The collected consumption data includes at least one inconsistency. The methods further include loading the collected consumption data into a computerized database adapted to store, process, and report on consumption. The computerized database then produces cleaned consumption data by reconciling consumption data inconsistencies. Finally, the computerized database is adapted to provide a consumption data report based at least in part on the cleaned consumption data. The consumption data report may take various forms and may communicate many types of information, but it at least will communicate consumption of at least one entertainment commodity.

BRIEF DESCRIPTION OF THE DRAWINGS

FIG. 1 is a block diagram showing interconnections between a variety of exemplary distribution network operators and a central host computer system.

DETAILED DESCRIPTION

FIG. 1 illustrates a measurement system, indicated generally at 10, for measuring consumption of entertainment commodities distributed through at least two distribution channels by one or more distribution network operators to one or more media receivers. Measurement system 10 enables collection, processing, and reporting on the consumption of an entertainment commodity, which may be distributed as a motion picture, a video game, a book, a song or other musical work, a television series, a music video, a movie trailer, an advertising spot, any combination of the above, or in other forms.

Typically, an entertainment commodity is produced by a content production company, such as a movie studio, an advertising agency, a television network, a music recording studio, a graphical design studio, an animation studio, etc. Some entertainment commodities may comprise multiple entertainment commodities, each of which may be produced by different production companies and each of which may be distributed together or separately. One example of such a composite entertainment commodity is a motion picture that includes theatrical and/or animated entertainment commodities as well as musical entertainment commodities. Other examples of entertainment commodities include advertising spots, whether for products or for other entertainment commodities. Similar to motion pictures, advertising spots include both theatrical elements and musical elements that may be distributed together or separately. As discussed herein, an entertainment commodity is the creative work that may be embodied in a number of different formats and distributed in a number of different manners. For example, an animated movie is a composite entertainment commodity that may be distributed in its entirety in a number of distribution channels. However, portions of the movie, such as trailers, soundtracks, etc., or products affiliated with the movie, may be distributed in still other distribution channels. As used herein, measuring the consumption of an entertainment commodity may include measuring the consumption of the entertainment commodity across all forms or embodiments in which the entertainment commodity may be cast or it may be limited to measuring only certain formats of the entertainment commodity. Continuing with the motion picture example, the present systems and methods may be adapted to measure consumption of the entertainment commodity as a motion picture, a soundtrack, or any other product, or it may only measure the consumption of the entertainment commodity as a motion picture.

Regardless of the type of entertainment commodity, whether audio, visual, theatrical, musical, multimedia, or some combination of the above, the entertainment commodity is distributed to the public via one or more distribution channels, the selection of which may depend on the nature of the entertainment commodity. In many cases, the entertainment company, which may be the content production company or another entertainment company with rights in the entertainment commodity, may elect to distribute the commodity through a distribution network operator independent from the entertainment company. However, some entertainment companies are affiliated with or include their own distribution network operators. As used herein, distribution network operator includes an entity responsible for the distribution of an entertainment commodity to one or more media receivers. A distribution network operator may be an independent wholesale or retail establishment that distributes the entertainment commodity to its customers that form its distribution network. Additionally or alternatively, a distribution network operator may include one or more establishments that first distribute the entertainment commodities to one or more distribution substations, such as the individual establishments in a chain, which form the distribution network. Additionally or alternatively, a distribution network operator may include resellers or intermediate distributors that purchase or otherwise obtain entertainment commodities from an upstream distributor for distribution to a downstream distributor. A distribution substation may be a separate establishment or entity within a chain, such as in theater chains or video rental chains, or may be separate distribution portals within the same entity or operated by the same distribution network operator, such as may be the case in cable MSOs or satellite providers.

As used herein, media receiver includes an entity that consumes the entertainment commodity. For example, a media receiver may include an end-user, such as a reader of a book or an attendee at a movie theater, that views, hears, or otherwise experiences the content of the entertainment commodity. Additionally or alternatively, a media receiver may include an intermediate distributor that buys copies, or obtains the right to make copies, of an entertainment commodity for subsequent sale, rental, or other distribution method to an end-user or another intermediate distributor. An entity may be both a distribution network operator and a media receiver. A movie rental establishment is one example of this situation. The movie rental establishment is a media receiver when it obtains copies of the entertainment commodity from an upstream distributor. The movie rental establishment is also a distribution network operator when it provides entertainment commodities for consumption (rental or purchase) by end-user media receivers.

A media receiver, whether an end-user media receiver or a distributor media receiver, may receive the entertainment commodity through any number of distribution channels. Exemplary, but not limiting, distribution channels for a theatrical entertainment commodity, such as a motion picture, include theaters, pay-per-view (PPV) providers, video-on-demand (VOD) providers, premium cable and satellite channels, other cable and satellite channels, traditional network broadcasts, video/DVD rental outlets, and video/DVD retail outlets. Distribution of an entertainment commodity via PPV by a cable MSO and the same entertainment commodity via PPV by a satellite provider, in some circumstances, may be considered to be distribution via different distribution channels. In some instances, motion picture entertainment commodities, as well as other types of entertainment commodities, can cross-over to other distribution channels after the content production company licenses the content of the motion picture for use in books, toys, apparel, or other consumer goods. Other types of entertainment commodities have a similar range of distribution channels available over the life of the commodity. For example, a musical entertainment commodity, whether an album, a single, or sheet music, may be distributed first as sheet music, then as a demo tape, as an MP3 via Internet distribution, as a single, as an album, as a music video, and/or as a live performance.

A distributor media receiver, such as the movie rental establishment introduced above, may also receive entertainment commodities through a number of distribution channels. For example, a movie rental establishment may receive copies of an entertainment commodity by purchasing a copy from a retail distributor, by purchasing a copy from a wholesale distributor, or by obtaining a copy through other distribution arrangements, such as through a transaction-based distributor. As used herein, an entertainment commodity is distributed in a distinct distribution channel when it is presented to the media receiver, whether an end-user or a distributor media receiver, in a manner different from other presentation methods, such as the different manners described above for theatrical and musical entertainment commodities.

Other distribution channels that may be available for distribution of an entertainment commodity, depending on the nature of the entertainment commodity, include Internet download, Internet streaming media, wireless distribution to mobile devices, such as laptops, PDA's, cell phones, and similar devices, via wireless Internet, cell phone services, or other wireless communication means. Accordingly, a distribution network operator may include Internet service providers, cell phone providers, or any other company that distributes entertainment commodities in one or more embodiments.

Accordingly, content production companies, and entertainment companies generally, may rely on a plurality of distribution channels to distribute a given entertainment commodity to one or more media receivers. Regardless of the planned life-cycle, the entertainment commodity is released to one or more distribution network operators for subsequent distribution through one or more distribution channels. A single distribution network operator may distribute entertainment commodities through more than one distribution channel, such as a cable multiple service operator (MSO) or a satellite provider that distributes a motion picture or other entertainment commodity to subscribers via one or more distribution channels, including PPV services, VOD services, premium channels, etc. Similarly, as described above, a single distribution network operator may operate one or more distribution substations. A distribution substation may be any subunit of a larger distribution network operator. For example, a theater chain includes multiple theaters, a retail chain includes several stores, and an MSO includes several relay stations or server stations to distribute the entertainment commodities.

Returning to FIG. 1, measurement system 10 illustrates several of the possible distribution network operators 12 that may be associated with the distribution of an entertainment commodity, such as a motion picture. Upon release, a motion picture may have a theatrical run wherein the entertainment commodity is distributed to distribution network operators 12, typically to theater chains 14 and to independent (i.e., non-chain) theaters 16. The motion picture may be distributed to several theater chains and to several independent theaters, each of which are independent from one another. Ordinarily, each theater chain 14 includes multiple individual theaters 18.

Continuing with the exemplary entertainment commodity first released as a motion picture, the ordinary life-cycle of the entertainment commodity begins with the theatrical run, in which the entertainment commodity is only available in movie theaters. The length of the theatrical run for a given motion picture varies according to a number of factors, but typically ranges from about one to three months. After the theatrical run, the motion picture is distributed, typically on DVD's and VHS tapes, to video outlets 20 and retail outlets 22. This period, a home video period, in which the entertainment commodity is distributed primarily, if not exclusively, on DVD or VHS tapes, also varies but typically begins 3-6 months after the initial release and lasts about 90 days. After the 90 days, the motion picture entertainment commodity is generally still available on DVD or VHS tapes in retail outlets or video outlets, but may also be available through other distribution channels. Video outlets 24 primarily provide the motion pictures to customers for short term rental, but also sell some VHS tapes and DVDs. Examples of video outlets include the Blockbuster chain, and also small independent video stores. Retail outlets, such as Target, typically provide the VHS tapes and DVDs for sale, but some retail outlets also provide rentals.

After the home video period, the motion picture entertainment commodities typically are distributed to Video-on-Demand (VOD) providers 24, and/or to cable and satellite PPV providers about 30-90 days after the home video release. Generally, about six to twelve months after the VOD release, the motion pictures are distributed by cable multi-system operators (MSOs) or satellite providers 26, who distribute the motion pictures to customers on premium cable or satellite channels for about six months. In some instances, the MSOs 26 may also provide VOD services. After the period on premium channels, the motion pictures are often distributed to television stations and networks, which may distribute the entertainment commodities themselves via traditional broadcasts or may distribute the entertainment commodities through cable MSOs or satellite providers distributing such stations and networks to end-users.

While the life-cycle described above and illustrated in FIG. 1 is a traditional life-cycle for a motion picture entertainment commodity, the life-cycle of a given entertainment commodity will vary based on the success of the entertainment commodity and on the original format of the entertainment commodity, such as a motion picture, a book, a video game, etc. For example, an episode of a television series may first be broadcast by a television network over traditional broadcast means or via cable or satellite providers. The entertainment commodity, or components thereof, also may be distributed through other channels, such as over the Internet as downloadable media or streaming media. Moreover, marketing and distribution theories are subject to change and the time periods and order of distribution described above may vary. For example, a motion picture entertainment commodity may first be released to theaters and VOD providers simultaneously or with much shorter time intervals between the various stages. Additionally or alternatively, other distribution channels may be utilized, such as streaming media or downloadable media via the Internet.

Despite the variability of the distribution methods for a given entertainment commodity and the numerous types of entertainment commodities available, all entertainment companies are concerned with the consumption of a given entertainment commodity. An entertainment company that is a content production company may be interested in the total consumption during the entire life-cycle and during each of the stages. An entertainment company that is a distribution network operator may be concerned with the total consumption of an entertainment commodity via the distribution channels provided by the distribution network operator. Additionally or alternatively, a distribution network operator may be concerned with the consumption of a given entertainment commodity during previous stages in its life-cycle. For example, a distribution network operator, such as a video outlet, may be concerned with the consumption during the theatrical run to determine an appropriate number of copies to be stocked. An advertising agency entertainment company may be interested in current or past consumption to know the value of its marketing efforts to increase the consumption of the entertainment commodity. Additionally, an advertising agency may be interested in the consumption of an entertainment commodity to determine the value of or the return from advertising associated with an entertainment commodity, such as the value of placing an ad in a commercial break of a television show, placing a preview before a movie, or paying for product placement within an entertainment commodity. An advertising agency may also be interested in consumption of their own entertainment commodities for showing the value of their ads to potential customers. The reasons for which an entertainment company may be interested in entertainment commodity consumption may vary between entertainment companies, but most will be concerned with the consumption of one or more entertainment commodities during at least one stage in the commodities' life-cycle.

As shown in FIG. 1, each distribution network operator 12, such as theater chain 14, theater 16,18, outlet 20,22, VOD provider 24, or MSO 26, typically operates one or more point-of-consumption (POC) computers 30 that record consumption data for entertainment commodities distributed through the respective distribution channels. Exemplary consumption data may include data such as ticket sales, video/DVD sales, rental fees, VOD/PPV orders, views of a particular show via other distribution channels, etc. Other exemplary consumption data may include the date, time, and price of each ticket sale, rental, order, or other form of consumption, and other sale parameters, such as method of payment. Each POC computer 30 may host an application, or may be programmed with an application for recording consumption data. The consumption data may be recorded in substantially real-time, such as being recorded at substantially the same time as the entertainment commodity is being consumed, or may be recorded after the fact, such as through inventories or periodic summations of transactions. The consumption data recorded by the POC may be transaction-level data showing each transaction or consumption separately rather than as part of a summation or periodic total.

The configuration of the POC computer may vary depending on the type of distribution network operator and the distribution channel through which the entertainment commodity is being distributed. For some distribution network operators, such as theaters, retail outlets, or video outlets, POC computer 30 may be integrated in or coupled to a cash register to record consumption of an entertainment commodity as it is being sold. Other distribution network operators may have additional or alternative suitable POC computer configurations. For example, a distribution network operator that distributes entertainment commodities over the Internet or via cell phones, may have a POC operatively associated with a server to record the individual downloads of the entertainment commodity. POC computers suitable for use in the present systems and methods may include a wide variety of hardware and software configurations adapted to meet the needs and systems of the distribution network operators. The software or applications associated with the individual POC computers may record and store the consumption data in tables, lists, databases, or other formats suitable for the individual distribution network operator. As will be seen herein, the computerized database of the present systems and methods is adapted to collect consumption data from distribution network operators regardless of the format, data type, etc. and to reconcile the collected data to produce cleaned consumption data from which reports can be generated.

POC computers 30 may collect, record, and/or transmit aggregate sales or other consumption data for each entertainment commodity being distributed through the associated distribution channel. POC computers 30 may be programmed to report flash grosses, such as on an hourly basis, which may be considered to be substantially immediate reports of aggregate sales, without accounting for certain adjustments common to theaters, such as returns, which are typically adjusted later. POC computers 30 may be programmed to collect virtually any type of consumption data on virtually any suitable schedule, such as described herein.

The consumption data recorded by POC computers 30 may include information about the entertainment commodity itself. For example, many distributions of entertainment commodities, such as distributions by cable MSOs, satellite providers, and Internet providers, include meta-data or informational data embedded in the distribution. Such meta-data may include information about the commodity including year produced, title, actors, directors, genre, plot summary, etc. POC computers 30 may record this meta-data along with the details of the consumption. Additionally or alternatively, POC computers 30 and/or DN computers 32 may be adapted to retrieve information about an entertainment commodity from some other source, such as another database, which may be hosted locally with or remotely from the POC computer and/or the DN computer. Additionally or alternatively, POC computer 30, and DN computer 32 when included, may collect just enough information to enable a Central Host Computer (CHC) system, discussed more fully below, to identify the entertainment commodity. The CHC system may be adapted to associate informational data with the consumption data, including informational data such as described above as meta-data. The informational material in addition to the title of the entertainment commodity may assist in identifying distributions of the same entertainment commodity recorded differently by different distribution network operators or by different POC computers. Additionally or alternatively, the additional informational material may enable additional or different reports.

The consumption data recorded by POC computers 30 may additionally or alternatively include user interaction data, commonly known as trick data. User interaction data may be generated by recording the user's interaction with a set-top box or an Internet browser or other interface between a user or consumer and the distribution network operator. In the example of a media receiver, such as an individual attending a movie at a theater, user interaction data may be generated by providing the attendees with feedback meters during or after the show. For the example of a media receiver, such as one or more individuals, watching television via cable, satellite, PPV, VOD, or other means, the user interaction data may be generated by recording remote control clicks or other changes to the status of the set-top box and/or television. Similar user interaction data may be collected for media receivers consuming entertainment commodities over the Internet. User interaction data, or trick data, may include data regarding the volume at which the commodity is being consumed, whether the media receiver, or consumer, fast-forwarded, rewound, or paused the entertainment commodity during consumption. Such trick data may be used to determine the level of interest the media receiver showed during the entertainment commodity. The trick data may then be used to determine scenes of a movie that are most enjoyed by consumers, which may help an entertainment company develop advertising plans or develop additional entertainment commodities. Additionally or alternatively, trick data may be used to determine if a particular commercial is well-received by the consuming audience as determined by the number of times a media receiver rewinds the set-top box (such as a PVR or DVR) to view the commercial again and again. Even entertainment companies producing or distributing news footage may find value in trick data to determine if particular newscasters or reporters are preferred more than others or if particular stories generated more interest than others. The trick data, or user interaction data, may be collected by the CHC system to aid in interpreting the consumption data and/or for use in developing valuable reports for users of the present systems and methods.

POC computers 30 associated with one or more of distribution network operators 12 may be operatively coupled to one or more distribution network (DN) computers 32. As illustrated in FIG. 1, DN computers 32 are separate from POC computers 30 and one DN computer 32 is associated with each of the distribution network providers. DN computers 32 and POC computers 30 may be integrated in a single computer system. Additionally or alternatively, a single DN computer 32 may be coupled to multiple POC computers 30 and/or multiple distribution network operators 12. Regardless of the configuration of POC computer 30 and DN computer 32, POC computer 30 is adapted to collect and report consumption data based on transactions between a media receiver and a distribution network operator. Additionally, DN computer 32, when implemented, may be adapted to receive the consumption data from POC computer 30 and to transmit the consumption data to a central host computer (CHC) system 34.

Depending on the distribution network operator and the configuration of its operations, DN computer 32 may simply relay the data from POC computer 30 to CHC system 34. Additionally or alternatively, DN computer 32 and/or POC computers 30 may aggregate, compile, filter, sort, append, or otherwise manipulate the consumption data before sending the same to CHC system 34. For example, DN computers 32 and/or POC computers 30 may be programmed to append geographical or other demographic information, such as a zip code, to consumption data that does not already include such information. DN computers 32 and/or POC computers 30 also may include other information about the distribution network operator from which CHC system 34 collects the consumption data to CHC system 34, such as its name, address, chain (if applicable), etc.

A central host computer system 34 is operatively coupled to the DN computers 32 and/or POC computers 30 to collect consumption data from at least one distribution network operator. CHC system 34 may be operated by an entity independent from the content production companies and from the distribution network operators 12 (if separate from the content production companies). CHC system 34 is programmed with, or has access to a database 36, which is configured to store, process, and report on the consumption of entertainment commodities distributed through the plurality of distribution channels. Database 36 may be configured in an SQL format, but any suitable database format may be used.

As illustrated in FIG. 1, CHC system 34 is operatively coupled to a plurality of DN computers 32 to collect consumption data for entertainment commodities delivered through at least two distribution channels. As a single DN computer 32 may receive and transmit consumption data on entertainment commodities distributed in a number of distribution channels, CHC system 34 alternatively may be operatively coupled to a single DN computer 32 to collect data on entertainment commodities distributed through at least two distribution channels. Additionally or alternatively, CHC system 34 may be operatively coupled directly to one or more POC computer 30 or DN computer 32. Accordingly, CHC system 34 is operatively coupled to one or more distribution network operator 12 to collect consumption data from the one or more distribution network operator 12 regarding entertainment commodities distributed through two or more distribution channels.

As discussed above, POC computers 30 may be programmed to record consumption data in substantially real-time. The period that qualifies as substantially real-time may vary depending on the type of entertainment commodity and/or on the distribution channel. For example, entertainment commodities distributed through theater distribution channels will generally be recorded in substantially real-time as the tickets are being sold. Other distribution channels, such as Internet-based distribution channels, may be recorded as the download or stream is initiated. Some distribution network operators may utilize a POC computer 30 associated with an inventory control system such that the POC computer periodically records changes in inventory or periodically retrieves data from the inventory control system to record the consumption in the POC computer. Whether recorded in substantially real-time or recorded periodically, the consumption data recorded by the POC computer may include transaction-level data or higher level consumption data. Transaction-level consumption data may include specific details about each transaction or each consumption of an entertainment commodity. Higher level consumption data may include summations of the consumption over a period of time, over a geographic region, or by some other categorization.

CHC system 34 coupled to the one or more POC computers 30 and/or DN computers 32 may collect the recorded consumption data on any suitable schedule. Entertainment companies often want to know about the performance of an entertainment commodity in a timely manner. Accordingly, CHC system 34 may be configured to collect consumption data from POC computers 30 and/or DN computers 32 periodically, such as once a month, once a week, once a day, every four hours, every hour, etc. The frequency with which the CHC system collects the consumption data may depend on the nature of the entertainment commodity, the distribution channel through which it is being consumed, and/or the distribution network operator distributing it. In some aspects of the present disclosure, the consumption data may be collected in substantially real-time. Such frequent data consumption may not be possible in some distribution channels, such as distribution channels including analog systems or significant human interaction. However, digital distribution channels where the consumption and distribution occurs almost entirely over digital or electronic pathways may enable data collection much more frequently, such as in substantially real-time, every five minutes, every fifteen minutes, every thirty minutes, or every hour. Accordingly, the consumption data may be collected from the distribution network operators according to any suitable schedule. The consumption data collected may include substantially real-time consumption data or data recorded according to another periodic recording schedule. The collected consumption data may additionally or alternatively include transaction-level consumption data or summary-level consumption data.

CHC system 34 may collect consumption data from POC computers 30 and/or DN computers 32 in any suitable manner. Typical communication methods include ftp, uucp, dial-up modem, and automated fax. Other formats may be used as desired.

As discussed briefly above, consumption data on entertainment commodities distributed through multiple distribution channels raises difficulties in accurate and concise reporting of all consumptions of a given entertainment commodity across two or more of the distribution channels. CHC system 34 and/or database 36 may host an application for reconciling consumption data inconsistencies to produce cleaned consumption data. As one example, CHC system 34 may host an application adapted to identify all transactions related to, or consumptions of, a single entertainment commodity and aggregate the consumption data for all such transactions, regardless of inconsistencies in titles, descriptions, embedded meta-data, distribution channels, or presentation format. In some implementations of the present systems and methods, CHC system 34 may use the data, such as the embedded meta-data, to identify the various consumptions of the same entertainment commodity even though the raw consumption data may not indicate a match. As one example, CHC system 34 may be adapted to identify consistent inconsistencies in the collected consumption data. For example, CHC system 34 may be programmed to know that data collected from a particular distribution network operator varies from data collected from another distribution network operator according to set patterns to enable the CHC system 34 to reconcile the two data sets more easily. Additionally or alternatively, CHC system 34 may be adapted to monitor over time the collected data, the sources of the collected data, and the steps performed to reconcile the differences. The CHC system 34 may be adapted to learn from its past performance to develop new algorithms for reconciling the collected data.

In one aspect of the present disclosure, a reporting interface 38 may be provided to database 36; the reporting interface may be an on-line, or Internet-based, interface. Database 36 may provide for a drill-down capability, whereby a user of interface 38 may select an item displayed on interface 38 and obtain more specific information about the Item. The drill down capability may be provided in several layers so that the user may drill down through several screens of interface 38 to access different information at each layer or on each screen.

Additionally or alternatively, CHC system 34 and/or database 36 may include or have access to a calendar, a schedule of various events, or other data that may be overlaid or associated with the consumption data in producing consumption data reports. For example, CHC system 34 and/or database 36 may include or have access to a calendar of elementary, secondary, or collegiate schedules, local, regional, or national event timing, weather patterns, releases of other entertainment commodities, or other events that may be relevant to the consumption of a given entertainment commodity.

Reporting interface 38 may be programmed to require user ids and passwords, or other security measures, whereby the reporting of consumption data in the various interfaces and reporting methods may be restricted to one or more users associated with a given distribution network operator or a given entertainment company. Additionally or alternatively, reporting interface 38 may be programmed to restrict reporting of consumption data to a demographic marketing area or other limiting factor. Alternatively, such restrictive programming may be incorporated into database 36 or CHC system 34.

Thus, system 10 provides for recording, tracking, and analyzing consumption data, such as revenue or number of transactions, for one or more entertainment commodities distributed through two or more distribution channels. The consumption data may be analyzed with a number of overlay filters including demographics and other factors, such as other events or circumstances, including those factors discussed above.

While the present systems and methods have been described as including an online reporting interface, other methods of reporting consumption data may be provided. For example, the reports may be distributed to users in numerous electronic or print formats suitable for the conveyance of such information. Other suitable methods and systems for providing user interface with the consumption data reports produced by the systems and methods herein may be implemented.

In some aspects of the present systems and methods, the consumption data may be used to create a predictive model for future consumption of the same or different entertainment commodities. For example, based on the predictive model, database 36 or CHC system 34 may be configured to facilitate a prediction of future consumption of the entertainment commodity through one or more distribution channels based on consumption or transactions in a first hour, or some other time, after the entertainment commodity is released. CHC system 34, database 36, and/or reporting interface 38 may be programmed to report a series of consumption predictions for one or more entertainment commodities. For entertainment commodities that begin as motion pictures, such consumption predictions may be based on one or more of theater ticket sales, motion picture VHS sales, motion picture DVD sales, motion picture VHS rentals, motion picture DVD rentals, or other relevant consumption data. Such predictions may be provided in a business projection method wherein database 36 collects a gross transactions report within any given time period, such as flash grosses, for a new motion picture. The database 36 and reporting interface 38 then may provide a report of predicted transactions for the motion picture based on the transactions report from the initial period. Preferably, the report of predicted transactions for the motion picture covers both the total life-cycle and intermediate periods, such as predicted transactions during the specific distribution channels.

CHC system 34 and/or database 36 may provide for recording life-cycle consumption, including tracking consumption at various points in the life-cycle, such as during discrete distribution channel stages. Therefore, the systems and methods of the present disclosure may be used to provide historical data and/or predictive models of entertainment commodity consumption. For example, CHC system 34 and/or database 36 may be set up to collect consumption data from POC computers 30 and/or DN computers 32 to produce one or more historical consumption data reports. Exemplary consumption data reports may include a consumption data report for consumption within an initial period, such as about four hours from an initial release of the motion picture, a consumption data report for the first three days after release of the motion picture, a consumption data report for a theatrical run of the motion picture, a consumption data report for a home video phase of the motion picture, a consumption data report for a VOD phase of the motion picture, and a consumption data report for a PPV phase of the motion picture, among other relevant reports.

The predictive model may be used for a new entertainment commodity, such as a motion picture, a videogame, or other entertainment commodity, to predict as each point in the life-cycle is reached the expected consumption, transactions, revenues, etc. for each of several future points in the life-cycle. In addition to the above noted one-hour and three-day periods, other points may include two hours, four hours or any other length. Similarly, the predictions may be made for revenues through the theatrical run, the home video phase, the VOD phase, the PPV phase, and subsequent phases, such as premium cable and TV. The prediction for each stage or phase in the life-cycle may be based on one or more of the earlier results for the entertainment commodity. Additionally or alternatively, the predictive model may include or incorporate historical data for other entertainment commodities that may be similar or related to the entertainment commodity in question. The similarities may be in content, genre, actors, directors, or in any other factor that may affect consumption, such as time of year or other extenuating circumstances. The predictive model may be based at least in part on consumption data collected or generated through the present systems and methods. Additionally or alternatively, the predictive model may be based at least in part on consumption data in historical archives generated through other means, such as records of box office sales or video rentals.

As discussed above, when reports based on the historical consumption data and/or the predictive model are made available via CHC system 34, database 36, and/or reporting interface 38, the reports may include security features to limit access to the reports. User ids and passwords may be used as noted above, so that, for each entertainment commodity made by or distributed by a particular entertainment company, access to full information in the predictive reports is restricted to the particular entertainment company and/or to a subset of users within the entertainment company. CHC system 34, database 36, and/or reporting interface 38 may be further programmed to provide a second entertainment company with access to only a limited range of information in the consumption data reports for entertainment commodities with which the second entertainment company is not related.

As discussed above, the present disclosure includes methods of measuring consumption of entertainment commodities distributed by at least one distribution network operator to a network of media receivers. The present methods are particularly suitable when the entertainment commodities are distributed through at least two distribution channels. In some aspects of the present disclosure, the methods include collecting first consumption data and second consumption data from at least one distribution network operator. The first consumption data may relate to entertainment commodities distributed through a first distribution channel and the second consumption data may relate to entertainment commodities distributed through a second distribution channel. The entertainment commodities, the distribution network operators, the media receivers, and the consumption data may be as described above.

The collected first and second consumption data may then be loaded into a computerized database adapted to store, process, and report on consumption. The computerized database may be associated with a central host computer system as described above. The computerized database may additionally or alternatively be operatively associated with one or more other computers. According to the methods of the present disclosure, cleaned consumption data may be produced by reconciling consumption data inconsistencies in the collected first consumption data and second consumption data. A consumption data report may be provided based at least in part on the cleaned consumption data. The consumption data report may communicate consumption of at least one entertainment commodity to a user, such as an entertainment company.

The cleaned consumption data may be produced by programs, software, or applications associated with the computerized database. The applications for producing the cleaned consumption data from the collected first consumption data and second consumption data may be stored in the database itself or may be stored or associated with a computer that is associated with the database.

As described above, one or more of the distribution network operators may distribute entertainment commodities through more than one distribution channel. For example, a first distribution network operator may distribute entertainment commodities in both a first distribution channel and a second distribution channel. Accordingly, the first and second consumption data may be collected from the same distribution network operator. While the methods and systems of the present disclosure have thus far been discussed in relation to two distribution network operators and two distribution channels, the present methods and systems may be adapted for use with one, two, or more of distribution network operators, each of which may distribute entertainment commodities in one or more distribution channels.

As discussed above, inconsistencies in the collected consumption data may be a result of many factors. The methods and systems of the present disclosure for reconciling the inconsistencies to produce the cleaned consumption data may account for one or more of these sources of inconsistencies. In a preferred aspect of the present disclosure, the methods and systems are adapted to account for all of the sources of inconsistencies in the collected consumption data. Exemplary, but not limiting, inconsistencies of concern for the present methods and systems are those that cause data collected about two separate transactions, or consumptions, to appear to be related to different entertainment commodities when they are related to the same entertainment commodity. For example, a rental of a video of a particular movie and a pay-per-view transaction of the same movie may be reflected in consumption data as consumption of two different entertainment commodities due to inconsistencies in the consumption data. The systems and methods of the present disclosure would remove the inconsistencies to enable a consumption data report reflective of all of the transactions or consumptions related to the entertainment commodity. In some aspects, the systems and methods would aggregate the consumptions across distribution channels to report on total consumption while preserving the ability to distinguish between distribution channels in producing customized reports.

In the example above, the inconsistency in consumption data may have been caused in part by the distribution through two different distribution channels. Inconsistencies may be introduced into the collected consumption data in a number of ways. For example, when the same entertainment commodity is distributed through the same distribution channel, such as via a pay-per-view provider, but by more than one distribution network operator, the entertainment commodity may be reported by the different distribution network operators in different manners, resulting in data inconsistencies that complicate accurate reporting of the consumption.

Examples of inconsistencies in the consumption data representing the same entertainment commodity that may be removed or reconciled to produce the cleaned consumption data include one or more of the following: inconsistent titles; inconsistent descriptions; inconsistent meta-data; inconsistent durations; or any other inconsistencies in any other data elements that may be collected. The inconsistencies in consumption data may result from a number of different factors, such as the entertainment commodity being distributed through multiple distribution channels or by multiple distribution network operators, as described above. The other elements in the production or distribution of the entertainment commodity may introduce additional or alternative inconsistencies in the data collected regarding the consumption of an entertainment commodity.

CHC system 34 and/or database 36 described above, independently or cooperatively, may function to produce the cleaned consumption data. The step of producing cleaned consumption data may include assigning a common identifier to all distributions of an entertainment commodity. For example, all distributions of a particular movie, whether by DVD sale, DVD rental, theater release, Internet distribution, VOD release, PPV release, or otherwise, may be tagged with an identifier to enable the systems and methods of the present disclosure to accurately report all of the consumptions of the entertainment commodity. CHC system 34 and/or database 36 described herein may add additional or alternative data segments to the collected consumption data to further assist in the reporting of the entertainment commodity consumption.

Additionally or alternatively, the step of producing cleaned consumption data may include removing extraneous data from the collected consumption data. The computerized database of the present systems and methods may be configured to utilize a predetermined number of data fields or predetermined data types. Depending on the consumption data collected from the various distribution network operators, the collected consumption data may include data fields that are irrelevant for the production of the consumption data report. Some or all of this irrelevant or extraneous data may be removed in the production of the cleaned consumption data.

Additionally or alternatively, the present methods may include validating the collected consumption data prior to or while producing the cleaned consumption data. The validation step may include confirming that the data collected is complete or is the same as what was transmitted by the distribution network operator. A number of suitable computerized processes are available for confirming the accuracy or completeness of the data collected. The step of validating the collected consumption data may additionally or alternatively include confirming that the data structure is correct or consistent with the data structure of the computerized database. Additionally or alternatively, validating the collected consumption data many include confirming the data content of the consumption data. For example, the collected consumption data may be evaluated to confirm that the data content is consistent with the type of content expected, either generally or on a field-by-field basis.

In the event that consumption data fails the validation step, the invalid collected data may be discarded or directed through a correction loop. The correction loop may include additional systems and methods to evaluate the invalid consumption data and to render it valid for the purposes of producing the cleaned consumption data.

Some distribution network operators may distribute entertainment commodities to their consumers or media receivers in a way that enables each media receiver to be distinguished from the others. For example, each set-top box may include an address or other identifier, each computer receiving entertainment commodities via the Internet may be identified by an IP address, each preferred customer card may have a unique identifier, etc. The various distribution network operators may use these distinct identifiers for a variety of purposes, such as billing, promotions, etc. For the purposes of the present systems and methods, the consumption data collected by the CHC system may include a distinguishing media receiver code. The distinguishing media receiver code may be the same as the identifiers used by the distribution network operators or it may be different.

For example, when the identifier used by the distribution network operator does not include any information that can be used to identify the actual individual or consumer, the distribution network operator's identifier may be used in the present systems and methods without privacy concerns.

However, if the identifier of the distribution network operator includes personally identifiable information, such as a telephone number, the distribution network operator's identifier may be converted to a distinguishing, but not identifying, media receiver code before being processed by the database of the present systems and methods. For example, the POC computer, the DN computer, or another system operated by the distribution network may hash the identifier into a code that can be used as a distinguishing media receiver code without providing the operator of the present systems and methods with personal information of the media receiver. Additionally or alternatively, the distribution network operator may convert the identifier to a distinguishing, but not identifying, media receiver code through an algorithm that enables the distribution network operator to translate the media receiver code back to the original identifier. In such scenarios, the distribution network operator may be able to use the present systems and methods to deliver better services to individual consumers.

Additionally or alternatively, the CHC system may include algorithms or applications adapted to hash any media receiver identifying information that may be collected. For example, hashing on the CHC system end of the present systems and methods may be desired if the distribution network operator is not capable of hashing or otherwise encrypting the identifying information and privacy concerns are relevant.

Additionally or alternatively, the privacy concerns that motivate the hashing or encryption of identifying information may not be a concern and the present systems and methods may use consumption data that includes such identifying information. For example, the present systems and methods may be operated by a single entertainment company that distributes entertainment commodities in a number of distribution channels or in a number of different formats. In such circumstances, the entertainment company may have permission to use the consumer's personal information in the systems and methods according to the present disclosure. Additionally or alternatively, distribution network operators may obtain permission from their consumers and media receivers to provide identifying information to a third party for use in systems and methods according to the present disclosure. The privacy of the personally identifiable information may not require encryption or hashing of the identifiable information for other reasons.

Whether the collected consumption data includes distinguishing media receiver codes with or without consumer identifying information, the distinguishing media receiver codes may facilitate additional features or aspects of the present systems and methods. For example, the distinguishing media receiver code may enable the production of a media receiver history for one or more of the media receivers through which an entertainment commodity was consumed. One or more of the consumption data reports produced by the present methods and systems may be based at least in part on the media receiver history for one or more media receivers.

As described above, the consumption data report produced by the systems and methods of the present disclosure may be based at least in part on a cleaned consumption data. Additional data may be incorporated into the consumption data report as desired. For example, environmental data may be collected related to at least one audience environment factor. The consumption data report may then be based at least in part on the collected environmental data and the cleaned consumption data. A number of environmental factors may affect the consumption of an entertainment commodity from day to day.

Common examples of such environmental factors include school schedules and weather patterns. Depending on the type of environmental factor desired to be incorporated in the consumption data report, the environmental data may be collected from external sources, including the distribution network operators and other information providers, or may be pre-programmed into the database or central host computing system. Examples of environmental factors that may be relevant to entertainment commodity consumption include the time of day, the day of the week, the date of the month, and/or the month or season of the year. Some entertainment commodities may be more highly consumed during one time period than other entertainment commodities. Similarly, entertainment commodities in movie theaters may be more highly consumed on weekends than during the week. One or more of these types of environmental factors may be collected as part of the consumption data.

Additional environmental factors that may be relevant may include the release date of the entertainment commodity, the number of other entertainment commodities available and their respective release dates, or other characteristics of the entertainment commodities. Similar to the way that local school schedules may affect consumption of entertainment commodities, other events may also affect entertainment commodity consumption. Accordingly, environmental data may be collected on community events schedules, regional event schedules, and/or national event schedules. Additionally or alternatively, environmental data may include data on weather, area demographics, local, religious, or national holidays, or any other factor or combination of factors that may affect entertainment commodity consumption.

One or more of the distribution network operators may distribute the entertainment commodities to at least one distribution substation prior to distribution to the media receivers. The relationship between distribution network operators and distribution substations was described above in the context of a retail chain for rental outlets that purchases copies of the entertainment commodities for distribution to individual stores or outlets for subsequent distribution to individual consumers or media receivers. However, distribution substations may include more than individual retail or rental stores. For example, a cable MSO operating in a geographic region may operate a plurality of distribution servers (or distribution substations) to accommodate subscriber demands. As with the retail chain, the distribution servers for a cable MSO may include POC computers from which consumption data may be collected. Additionally or alternatively, the distribution servers may communicate consumption to the cable MSO and the consumption data may be collected from the cable MSO. Other distribution network operators may operate different types of distribution substations. The nature of the distribution substation may vary for the different distribution channels and the different distribution network operators.

Regardless of the distribution channel used to distribute the entertainment commodity, one or more of the distribution network operators may operate one or more distribution substations. In some aspects of the present methods, at least one of the first and second consumption data may be collected from one or more of the distribution substations, either directly or indirectly. The collected consumption data may be substantially real-time data and/or substantially transaction level data of the entertainment commodities distributed through the distribution substation from which the consumption data is collected. The consumption data may be collected from the substation according to any one or more of the collection schedules discussed above, which collection schedule may depend on the nature of the entertainment commodity, the nature of the distribution channel, the nature of the entertainment company seeking the information, or other factors.

The consumption data report produced by the present methods and systems have been described above. The consumption data report may be configured to present the consumption data in a number of formats to communicate a variety of information about entertainment commodity consumption to the user of the present methods and systems. As described above, the consumption data report may report and/or compare consumption of one or more entertainment commodities during a given time period or during different time periods. The comparisons may incorporate environmental factors, such as those described above, or other factors relevant to end-users of the present systems and methods, such as decision-makers at entertainment companies. Exemplary consumption data reports many include total consumption, total consumption rate, top distribution network operators, top entertainment commodities, or other such reports. The consumption reports may enable drill-down functionality or other filtering functions to enable a user to view consumption or ratings by a variety of classifications or categorizations. Several exemplary reports are described below in the context of entertainment commodities distributed via VOD providers; they are provided by way of example and not as limitations. Similar or corresponding reports, as well as different reports, may be generated for different distribution channels or distribution network operators depending on the type or form of the entertainment commodities being distributed and the information needs of the end-user entertainment companies.

One exemplary report may include general usage statistics, such as recent trends in orders. The general usage statistics also may include the percentage of set-top boxes that have used VOD services within a given time period. Additionally or alternatively, the reports may include the rate at which the VOD services are being ordered or the rate at which the services are being purchased, either by set-top box, by region, overall by VOD provider, by entertainment commodity type or genre, by content production company, or by other categorizations. The reports also may include statistics regarding the top ten VOD providers, the top ten entertainment commodities, or the top ten content production companies in a region or nationally or for a given time period. Consumption data reports also may enable users to view consumption by content type, by the time of day or by the day of the week at which the orders were placed, or by a combination of the two.

As described above, some consumption data reports may be based in part on media receiver codes. In addition to enabling the production of media receiver histories, these media receiver codes may enable a user to determine the number of orders placed by specific set-top boxes. This data can be used to determine what percentage of the VOD orders are coming from what percentage of the subscriber set-top boxes. Additionally or alternatively, the media receiver code may enable a user, such as a cable MSO, to determine the total amount of time a particular set-top box has been used to view VOD entertainment commodities.

In some aspects of the present system and methods, the consumption data collected may enable reporting to high levels of detail. For example, the consumption may be analyzed by which content production company produces entertainment commodities that are most frequently ordered, or the entertainment content production company most preferred by a given media receiver, as identified by a media receiver code. The media receiver history also may enable a report that illustrates what entertainment commodities are viewed in succession by a given media receiver. Such a report may enable a user to determine trends in viewership or consumption. In the context of VOD programming, such reports may enable a user to determine the effectiveness of advertising placed in a first entertainment commodity based on whether the media receiver subsequently ordered the entertainment commodity advertised in the first entertainment commodity.

The consumption data reports of the present systems and methods may include one or more of the report described herein. Moreover, the consumption data reports may be adapted to incorporate or illustrate additional or alternative comparisons or reports depending on the desires and needs of the end-users. The reporting of historical consumption data can be enhanced when overlaid with one or more of the environmental factors described above. Additionally or alternatively, the consumption data reports may be enhanced to include projections of future consumption of one or more entertainment commodities.

The projections of future consumption may be based at least in part on historical consumption data. The historical consumption data may be collected over time as the present systems and methods are implemented. Additionally or alternatively, historical consumption data may be collected from one or more archives of historical entertainment commodity consumption. For example, historical records of movie theater performance or rental performance of particular motion pictures may be used to develop a predictive model. The predictive model may use historical consumption data as well as other factors to project future consumption of entertainment commodities.

Measurement systems and methods according to the present disclosure are applicable to the entertainment industry, including entertainment companies such as entertainment content production companies, distribution network operators, merchandise retailers, advertisers, and many other decision-makers that need up-to-date, accurate tracking and reporting of entertainment commodity consumption across multiple distribution channels.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring, nor excluding, two or more such elements.

It is believed that the following claims particularly point out certain combinations and subcombinations that are directed to one of the disclosed inventions and that are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

Although the present invention has been shown and described with reference to the foregoing operational principles and preferred embodiments, it will be apparent to those skilled in the art that various changes in form and detail may be made without departing from the spirit and scope of the invention. The present invention is intended to embrace all such alternatives, modifications and variances that fall within the scope of the appended claims.

We claim:

1. A computerized system for measuring consumption of entertainment commodities by end user media receivers, the commodities distributed through at least two different types of distribution channels by one or more distribution network operators to one or more media receivers, the system comprising:
　a first POC computer configured to collect and report a first transaction-level consumption dataset not comprising user interaction data, the first transaction-level consumption dataset based on transactions between a first media receiver and a first distribution network operator in a first distribution channel in accordance with a first configuration associated with the first distribution channel and the first distribution network operator;
　a second POC computer configured to collect and report a second transaction-level consumption dataset comprising user interaction data, the second transaction-level consumption dataset based on transactions between a second media receiver and a second distribution network operator in a second distribution channel in accordance with a second configuration associated with the second distribution channel, the user interaction data, and the second distribution network operator,
　wherein the first consumption dataset's representation of the entertainment commodity is inconsistent with the second consumption dataset's representation of the entertainment commodity in a first respect because of differences between the first distribution channel and the second distribution channel,
　wherein the first consumption dataset's representation of the entertainment commodity is inconsistent with the second consumption dataset's representation of the entertainment commodity in a second respect because of differences between the first distribution network operator and the second distribution network operator;
　a central host computer system configured to:
　　receive the first consumption dataset;
　　receive the second consumption dataset;
　　validate that the first consumption dataset agrees with the first configuration;
　　validate that the second consumption dataset agrees with the second configuration;
　　recognize a history of consistent inconsistencies between data consumption data from the first POC produced in accordance with the first configuration and consumption data from the second POC produced in accordance with the second configuration; and identify the entertainment commodity in both the first dataset and the second dataset by:
  reconciling the first consumption dataset and the second consumption dataset in the first respect using the history of consistent inconsistencies, the validation that the first consumption dataset agrees with the first configuration, and the validation that the second consumption dataset agrees with the second configuration; and
  reconciling the first consumption dataset and the second consumption dataset in the second respect using the history of consistent inconsistencies, the validation that the first consumption dataset agrees with the first configuration, and the validation that the second consumption dataset agrees with the second configuration.

2. The system of claim 1 wherein each of the first and second media receiver is associated with a distinguishing code that specifies the end user media receiver without identifying any individual consumer.

3. The system of claim 1 wherein the first consumption dataset includes environmental data for each consumption of an entertainment commodity.

4. The system of claim 3 wherein the environmental data are selected from time of the day, day of the week, date of the month, month, period of the year, entertainment commodity release date, number of other entertainment commodities available, local school schedule, community event schedule, regional event schedule, national event schedule, weather, area demographics, holidays, and combinations thereof.

5. The system of claim 1 further comprising a plurality of distribution network computers configured to collect consumption data from the first and second POC computers substantially in real time.

6. The system of claim 5 wherein the central host computer system is configured to collect consumption data from the one or more distribution network computers substantially in real time.

7. The system of claim 6 further comprising a database configured to store cleaned consumption data substantially in real time.

8. The system of claim 1 wherein the central host computer system is configured to produce a report of the consumption of an entertainment commodity.

9. The system of claim 8 wherein the report compares consumption of one or more entertainment commodities distributed by one or more distribution network operators.

10. The system of claim 8 wherein the report compares includes projections of future consumption of one or more entertainment commodities.

11. The system of claim 10 wherein the central host computer system is configured to collect historical consumption data from one or more archives and to store the historical consumption data into a database, wherein the projections of future consumption are based at least in part on the historical consumption data.

12. A method in a computing system of measuring consumption of entertainment commodities by end user media receivers, the entertainment commodities distributed through at least two different types of distribution channels by one or more distribution network operators to the end user media receivers, the method comprising:
  receive a first consumption dataset from a first POC computer configured to collect and report a first transaction-level consumption dataset based on transactions between a first media receiver and a first distribution network operator in a first distribution channel in accordance with a first configuration associated with the first distribution channel and the first distribution network operator, the first transaction-level consumption dataset not comprising user interaction data;
  receive the second consumption dataset from a second POC computer configured to collect and report a second transaction-level consumption dataset comprising user interaction data, the second transaction-level consumption dataset based on transactions between a second media receiver and a second distribution network operator in a second distribution channel in accordance with a second configuration associated with the second distribution channel, the user interaction data, and the second distribution network operator;
  validate that the first consumption dataset agrees with the first configuration;
  validate that the second consumption dataset agrees with the second configuration;
  recognize a history of consistent inconsistencies between data consumption data from the first POC produced in accordance with the first configuration and consumption data from the second POC produced in accordance with the second configuration; and
  identify the entertainment commodity in both the first dataset and the second dataset by:
    reconciling the first consumption dataset and the second consumption dataset in the first respect using the history of consistent inconsistencies, the validation that the first consumption dataset agrees with the first configuration, and the validation that the second consumption dataset agrees with the second configuration; and
    reconciling the first consumption dataset and the second consumption dataset in the second respect using the history of consistent inconsistencies, the validation that the first consumption dataset agrees with the first configuration, and the validation that the second consumption dataset agrees with the second configuration.

13. The method of claim 12, further comprising receiving the data reflecting the consumption of entertainment commodities from a point-of-consumption (POC) computer associated with each end user media receiver.

14. The method of claim 12, further comprising producing a report of the consumption of the entertainment commodity.

15. The method of claim 12, further comprising projecting future consumption of the entertainment commodity.

16. A central host computer system configured to:
  receive a first consumption dataset from a first POC computer configured to collect and report a first transaction-level consumption dataset based on transactions between a first media receiver and a first distribution network operator in a first distribution channel in accordance with a first configuration associated with the first distribution channel and the first distribution network operator, the first transaction-level consumption dataset not comprising user interaction data;
  receive the second consumption dataset from a second POC computer configured to collect and report a second transaction-level consumption dataset comprising user interaction data, the second transaction-level consumption dataset based on transactions between a second media receiver and a second distribution network operator in a second distribution channel in accordance with a second configuration associated with the second distribution channel, the user interaction data, and the second distribution network operator, validate that the first consumption dataset agrees with the first configuration;

validate that the second consumption dataset agrees with the second configuration;

recognize a history of consistent inconsistencies between data consumption data from the first POC produced in accordance with the first configuration and consumption data from the second POC produced in accordance with the second configuration; and identify the entertainment commodity in both the first dataset and the second dataset by:
  reconciling the first consumption dataset and the second consumption dataset in the first respect using the history of consistent inconsistencies, the validation that the first consumption dataset agrees with the first configuration, and the validation that the second consumption dataset agrees with the second configuration; and
  reconciling the first consumption dataset and the second consumption dataset in the second respect using the history of consistent inconsistencies, the validation that the first consumption dataset agrees with the first configuration, and the validation that the second consumption dataset agrees with the second configuration.

* * * * *